US010685127B2

(12) United States Patent
Kundu et al.

(10) Patent No.: US 10,685,127 B2
(45) Date of Patent: Jun. 16, 2020

(54) COGNITIVE WIDGETS AND UI COMPONENTS FOR PRESERVING PRIVACY AND SECURITY

(71) Applicant: International Business Machines Corporation, Armonk, NY (US)

(72) Inventors: Ashish Kundu, Elmsford, NY (US); Amit Anil Nanavati, New Delhi (IN); Danny Soroker, Larchmont, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

(21) Appl. No.: 15/864,197

(22) Filed: Jan. 8, 2018

(65) Prior Publication Data
US 2019/0213336 A1 Jul. 11, 2019

(51) Int. Cl.
*G09C 1/00* (2006.01)
*G06F 21/60* (2013.01)
(Continued)

(52) U.S. Cl.
CPC .......... *G06F 21/604* (2013.01); *G06F 16/683* (2019.01); *G06F 21/32* (2013.01); *G06F 21/6245* (2013.01); *G06F 21/84* (2013.01)

(58) Field of Classification Search
CPC ........ G06F 21/00; G06F 21/566; G06F 21/55; G06F 21/84; H04L 2209/04; H04L 2209/16; H04W 12/00508; H04W 12/0053
See application file for complete search history.

(56) References Cited

U.S. PATENT DOCUMENTS

| 6,374,145 B1* | 4/2002 | Lignoul | G06F 21/35 700/17 |
| 2006/0210167 A1* | 9/2006 | Inoue | H04L 63/0861 382/190 |

(Continued)

FOREIGN PATENT DOCUMENTS

WO  2015/196448 A1  12/2015

OTHER PUBLICATIONS

Georganti et al.; "Speaker Distance Detection Using a Single Microphone"; IEEE Transactions on Audio, Speech, and Language Processing, vol. 19, No. 7; Sep. 2011; 14 pages.

(Continued)

*Primary Examiner* — Olugbenga O Idowu
(74) *Attorney, Agent, or Firm* — Cantor Colburn LLP; Anthony Curro

(57) ABSTRACT

Provided is a computer-implemented method for automatically preserving privacy in a user interface. The method includes detecting privacy objects that are being presented via a UI of a computing device to a first user. A security status of the UI is evaluated based at least in part on analyzing audio captured by an audio capture device of the computing device. A privacy mode of the UI that executes privacy actions that are associated with the detected privacy objects is activated based on determining that the security status is in an unsecure state. The privacy mode is deactivated based on determining that the security status has changed from the unsecure state to a secure state, in which determining that the security status has changed from unsecure to secure is based on analyzing the audio captured by the audio capture device of the computing device.

18 Claims, 7 Drawing Sheets

(51) Int. Cl.
    *G06F 21/32*     (2013.01)
    *G06F 16/683*     (2019.01)
    *G06F 21/62*     (2013.01)
    *G06F 21/84*     (2013.01)

(56) References Cited

U.S. PATENT DOCUMENTS

| | | |
|---|---|---|
| 2014/0115690 A1 | 4/2014 | Huang et al. |
| 2016/0140349 A1* | 5/2016 | Brown .................. G06F 21/602 713/189 |
| 2016/0283698 A1 | 9/2016 | Huang et al. |
| 2016/0371504 A1 | 12/2016 | Huang et al. |

OTHER PUBLICATIONS

Mell et al.; "The NIST Definition of Cloud Computing-Recommendations of the National Institute of Standards and Technology"; US Department of Commerce; Sep. 2011; 7 pages.

\* cited by examiner

US 10,685,127 B2

COGNITIVE WIDGETS AND UI COMPONENTS FOR PRESERVING PRIVACY AND SECURITY

BACKGROUND

The present invention generally relates to privacy and masking systems, and more specifically, to systems, computer-implemented methods, and computer program products that utilize cognitive widgets and user interface (UI) components configured and arranged to preserve privacy and security.

There are several situations in which a computer system user will need to enter private information at a UI of a computer device. For example, computer systems can include user authentication mechanisms that require the user to enter at a UI authentication credentials (e.g., a username and a password) to access the computer system. As another example, some form-based authentication interfaces require a user to enter at a UI private items and/or personal data (e.g., passwords, usernames, social security numbers, addresses, credit card numbers etc.). There are various mechanisms for preventing unauthorized persons from viewing such private items and/or personal data on a UI of the computer device. One mechanism is to entirely cover on the UI the data that is entered by the user into particular fields. Another mechanism is to briefly display on the UI a character that is entered into a field. Another mechanism is to give a user a choice to either display or not display the private items and/or personal data.

SUMMARY

Embodiments of the present invention provide a computer-implemented method for automatically preserving privacy in a UI. A non-limiting example of the computer-implemented method includes detecting one or more privacy objects that are being presented via a UI of a computing device to a first user. The method evaluates a security status of the UI based at least in part on analyzing audio captured by an audio capture device of the computing device. A privacy mode of the UI that executes one or more privacy actions that are associated with one or more of the detected privacy objects is activated based at least in part on determining that the security status is in an unsecure state. In some embodiments of the present invention, the privacy mode is deactivated based at least in part on determining that the security status has changed from the unsecure state to a secure state, in which determining that the security status has changed from unsecure to secure is based at least in part on analyzing the audio captured by the audio capture device of the computing device.

Embodiments of the present invention provide a system for automatically preserving privacy in a UI, in which the system includes one or more processors that are configured to perform a method. A non-limiting example of the computer-implemented method includes detecting one or more privacy objects that are being presented via a UI of a computing device to a first user. The method evaluates a security status of the UI based at least in part on analyzing audio captured by an audio capture device of the computing device. A privacy mode of the UI that executes one or more privacy actions that are associated with one or more of the detected privacy objects is activated based at least in part on determining that the security status is in an unsecure state. In some embodiments of the present invention, the privacy mode is deactivated based at least in part on determining that the security status has changed from the unsecure state to a secure state, in which determining that the security status has changed from unsecure to secure is based at least in part on analyzing the audio captured by the audio capture device of the computing device.

Embodiments of the invention are directed to a computer program product for automatically preserving privacy in a UI, the computer program product including a computer readable storage medium having program instructions embodied therewith. The program instructions are executable by a system having one or more processors to cause the system to perform a method. A non-limiting example of the computer-implemented method includes detecting one or more privacy objects that are being presented via a UI of a computing device to a first user. The method evaluates a security status of the UI based at least in part on analyzing audio captured by an audio capture device of the computing device. A privacy mode of the UI that executes one or more privacy actions that are associated with one or more of the detected privacy objects is activated based at least in part on determining that the security status is in an unsecure state. In some embodiments of the present invention, the privacy mode is deactivated based at least in part on determining that the security status has changed from the unsecure state to a secure state, in which determining that the security status has changed from unsecure to secure is based at least in part on analyzing the audio captured by the audio capture device of the computing device.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
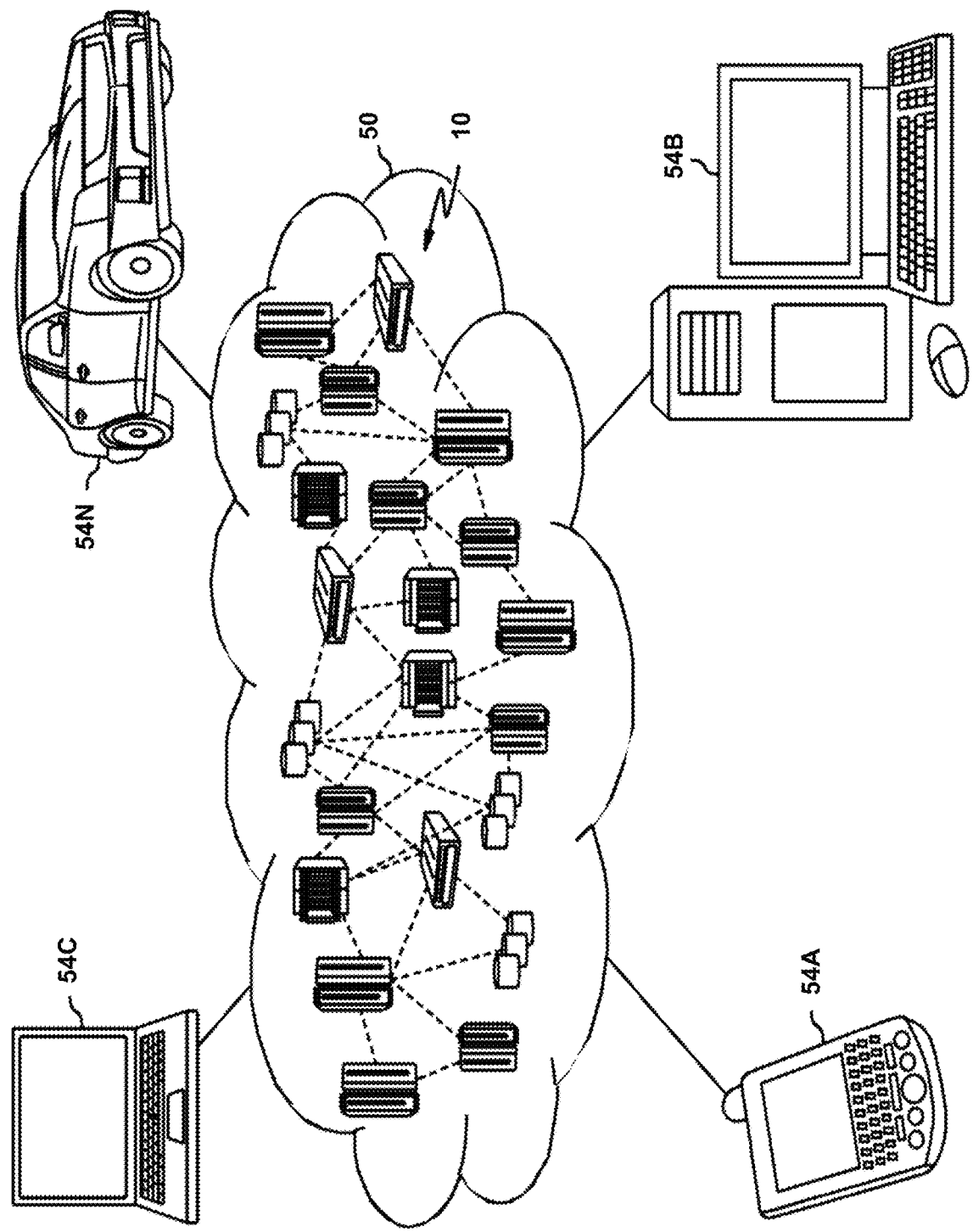
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
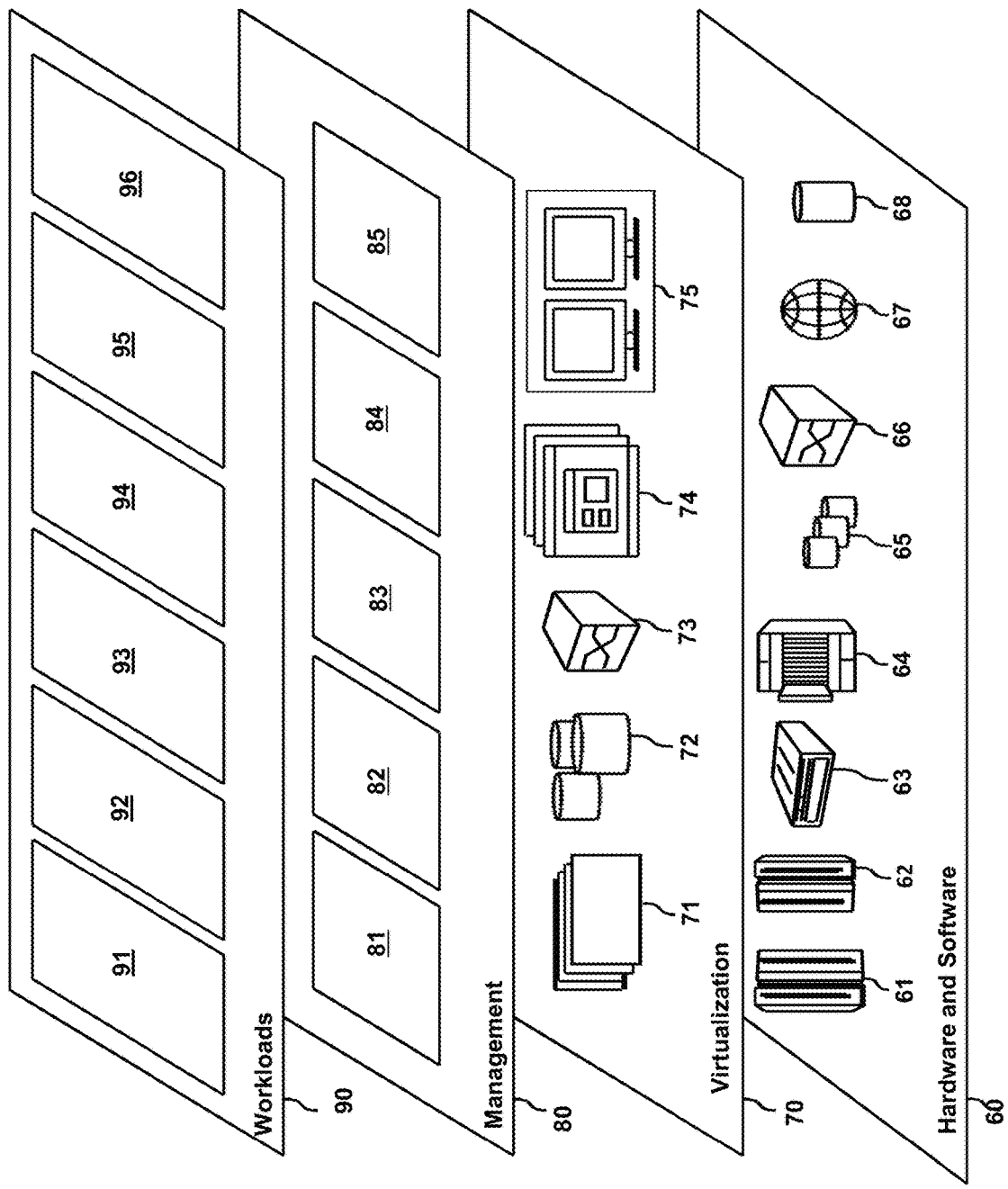
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and privacy content processing 96.

Turning now to an overview of technologies that are more specifically relevant to aspects of the invention, personal computers and mobile devices are used in common practice to perform multitasking operations. A user may choose to interact with a display of the computer device that displays multiple windows and/or tabs at any given time for multiple applications running on the computer device. Privacy concerns can arise when the user does not wish for the computer device to display private items and/or personal data (e.g., passwords, usernames, social security numbers, addresses, credit card numbers etc.) in a manner that would allow others to view the private items and/or personal data. In one example scenario, a user may search for a window that the user intends to show to person who is located beside the user, and during that search the user may cycle through windows and/or tabs and inadvertently show private information to the other person that is found in one of the windows/tabs being displayed.

There are a variety of UIs that are designed for authentication purposes such as, for example, an interface for logging into a website. Some form-based authentication interfaces allow a user to enter data into the several fields of the UI such as, for example, username and password fields. One mechanism for protecting privacy is to entirely cover the data that is entered by the user into particular fields, such as the password field. However, as there is a tradeoff that occurs between privacy and convenience, a user may be more prone to make mistakes if contents of fields are entirely obscured such as by missing or repeating characters when entered text into a given field. There are a variety of masking operations that aim to help with this tradeoff, such as operations that briefly show a character that is entered into a field or covering a field having text in when a window focus is changed. Another mechanism is to give a user a choice between whether to reveal the contents of a field, in which the user selected the choice via a checkbox.

Several technical problems arise in prior systems. For example, one problem found in prior systems is that the logic that is used to drive what content is to be revealed and what content is to be obscured is often fixed. The logic does not take into consideration a user's particular context that is learned via machine learning to determine what portions of sensitive content to mask. Moreover, although systems may mask items on the computer based on detecting a presence of other users in images captured by the computer, not all computers include image capturing device, nor do those system calculate relative distances and take actions that are based on relative distances. As the approaches identified above are binary, they do not take into consideration the level of granularity of the sensitivity of entered data. As most data that is entered in an authentication form may be sensitive to some extent, the level of sensitive of the data may change based on a user context by, however, said systems do not take into consideration levels of sensitivity of data based on context learned via machine learning. For example, although a password of a user is often sensitive, in some situations a username of the user may also be sensitive enough to want keep private, such as when the username contains the user's email address or a meaningful identification number such as a social security number and the user is operating on a computing device that is at a public locations. Knows systems do not provide this functionality.

Turning now to an overview of the aspects of the invention, one or more embodiments of the invention address the above-described shortcomings of the prior art by providing automatic detection and privacy-preserving operation techniques for protecting private and/or personal content of a user, in which certain techniques are based on detecting a potential unauthorized viewing event of a UI based on analysis of audio and/or determining a privacy-preserving operation for each private objects based on a user's particular context that is learned via machine learning. In some embodiments of the present invention, a potential unauthorized viewing of the UI by one or more people other than the user is detected by evaluating a security status of the UI based at least in part on an analysis of audio captured by an audio capture device of a computing device of the user. For example, in some embodiments of the present invention, the audio analysis includes detecting one or more voices in the captured audio that are not of the user, then for each given voice that is detected as not being of the user, calculating a corresponding distance between a location of the given voice and a location of the computing device; and detecting that at least one of the corresponding distances is less than or equal to a configurable threshold distance.

In some embodiments of the present invention, privacy-preserving operations that take into consideration the level of granularity of the sensitivity of entered data are determined based on a user's context that is established via machine learning to evaluate a level of privacy of the user that is associated with a particular environment such as based on the number of other people that are within a preselected distance from a reference point, in which the reference point can be, for example, the computing device. For example, in some embodiments the present invention, if a user intends to enter user login information into a portal via a computer, one or more embodiments of the present invention may display some field values in the clear when the user's context establishes that the user is in a private setting, which may include for example leaving password information that is entered into a password field in the clear. In contrast, in some embodiments of the present invention, if the user's context establishes that the user is in a crowded public place people, all data that is entered into the fields of the authentication portal may be obscured, including, for example, the username entered by the user.

One or more of the above-described aspects of the invention address the shortcomings of the prior art by providing functionality that allows for privacy preserving operations such as anonymization, randomization, and/or redaction to be performed on sensitive data in a fine, gradual manner based on a user's context that is learned via machine learning. Moreover, as not all computing devices have image capturing technology and/or as those systems do not calculate relative distances and take actions that are based on relative distances, one or more of the above-described aspects of the invention address the shortcoming of the prior art by evaluating a security status of the UI based at least in part on analyzing audio captured by an audio capture device of the computing device and then based at least in part on determining that the security status of the UI is in an unsecure state, activating a privacy mode of the UI that executes one or more privacy actions that are associated with one or more of the detected privacy objects.

Figure 3:
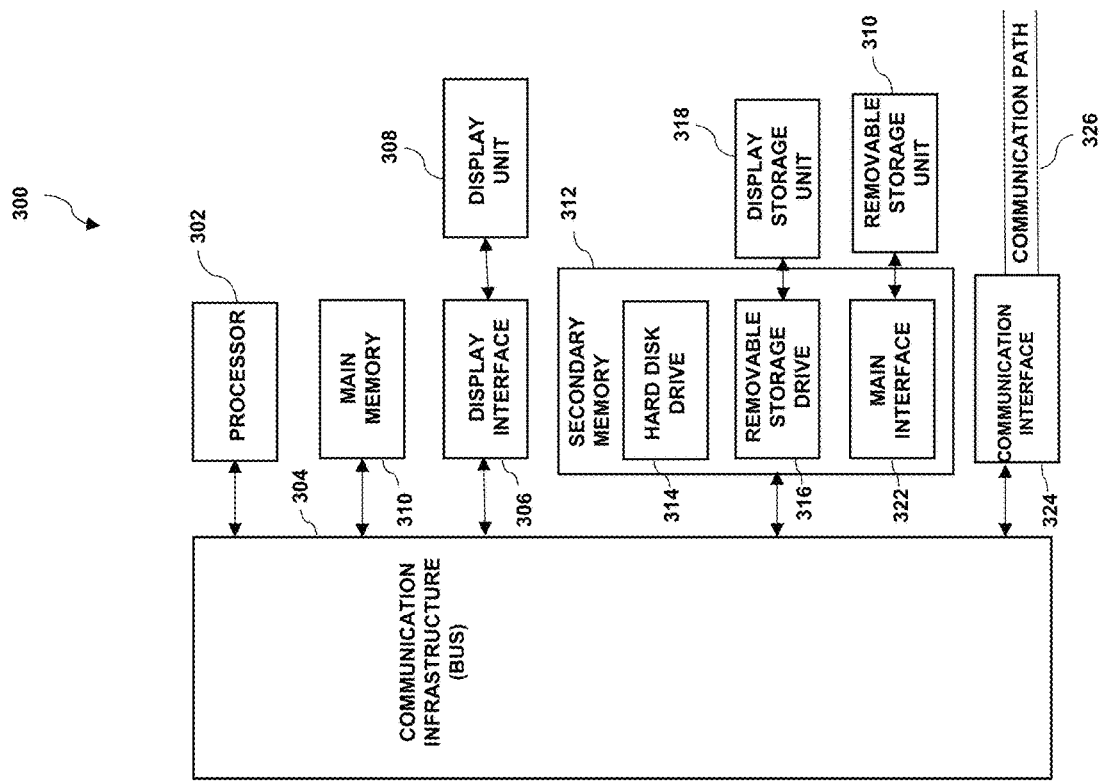
FIG. 3 depicts an exemplary computer system capable of implementing one or more embodiments of the present invention.

Turning now to a more detailed description of aspects of the present invention, FIG. 3 illustrates a high level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional system are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
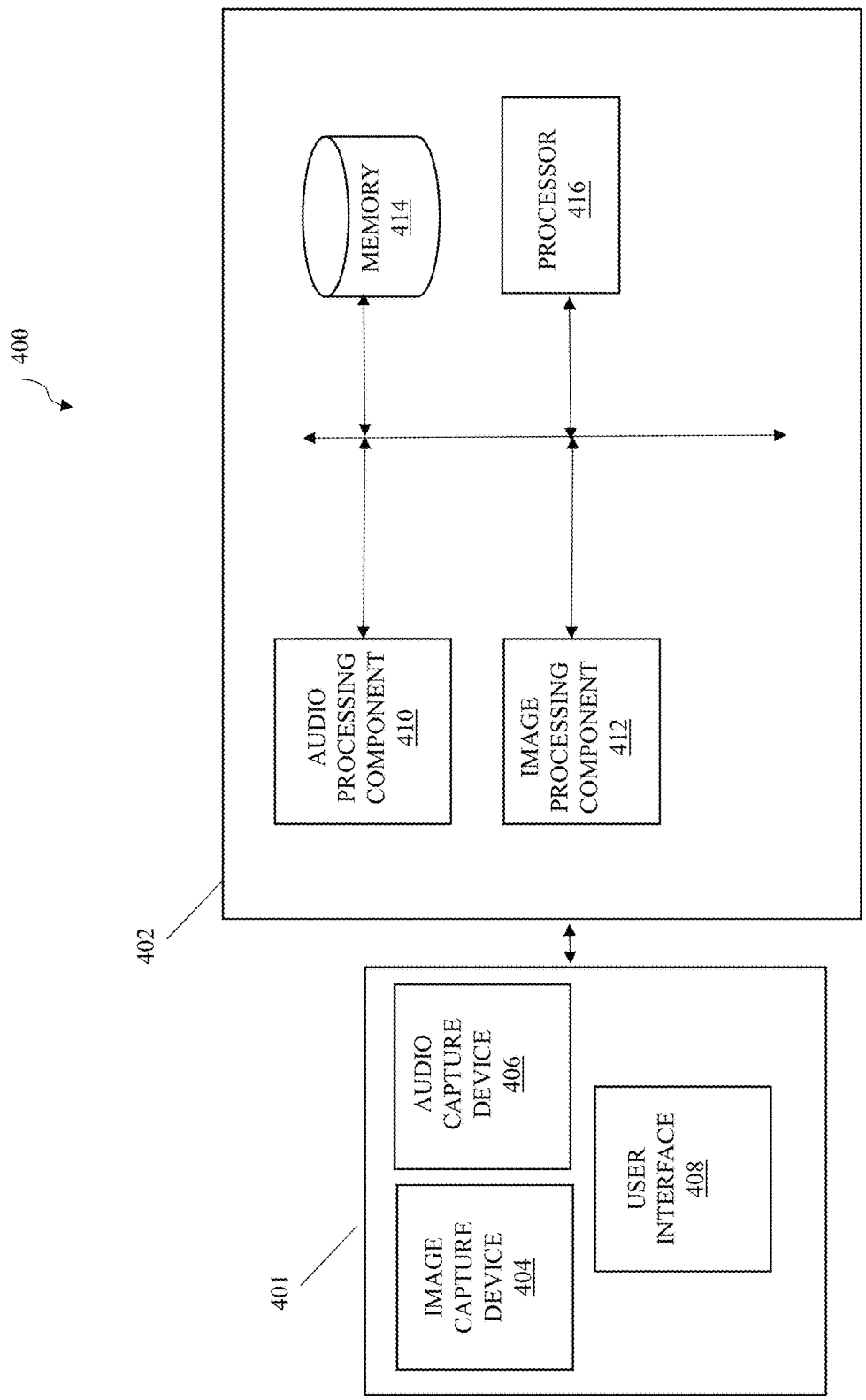
FIG. 4 depicts an exemplary system that automatically preserves privacy of sensitive information in a UI in accordance with one or more embodiments of the present invention.

FIG. 4 depicts an example computer system 400 that is capable of implementing one or more embodiments of the present invention. System 400 is a machine learning system that can be utilized to solve a variety of technical issues (e.g., learning previously unknown functional relationships) in connection with technologies such as, but not limited to, machine learning technologies, data encryption and privacy protection technologies, data analytics technologies, data classification technologies, data clustering technologies, recommendation system technologies, signal processing technologies, and/or other digital technologies. System 400 employs hardware and/or software to solve problems that are highly technical in nature, that are not abstract and that cannot be performed as a set of mental acts by a human.

In certain embodiments of the invention, some or all of the processes performed by system 400 are performed by one or more specialized computers (e.g., one or more specialized processing units, a specialized computer with a privacy component, etc.) for carrying out tasks related to machine learning. In some embodiments of the invention, system 400 and/or components of the system are employed to solve new problems that arise through advancements in technologies mentioned herein.

In the example shown in FIG. 4, system 400 includes a computing device 401 and a privacy component 402, in which the privacy component 402 is capable of automatically preserving privacy in a UI of the computing device 401. In some embodiments of the present invention, the computing device 401 includes an image capture device 404, an audio capture device 406, and/or a UI 408 (e.g., a graphical user interface). The image capture device 404 is configured to captures images and then to transmit the captured images to the privacy component 402 for further analysis. In some embodiments of the present invention, the image capture device 404 is configured to capture images taken of a scene in front of a monitor of the computing device 401 such that people in front of the monitor of the computing device 401 can be seen within one or more of the captured images. For example, in some embodiments of the present invention, the image capture device 404 is configured to capture images of people that are within a preselected distance of the computing device 401. In some embodiments of the present invention, the image capture device 404 includes a camera, such as a webcam. The audio capture device 406 is configured to capture audio and to transmit the captured audio to the privacy component 402 for analysis. For example, in some embodiments of the present invention, the audio capture device 406 is configured to capture audio from voices that are within a preselected distance of the computing device 401. In some embodiments of the present invention, the audio capture device 406 is configured to distinguish between voices and background noise, and then to capture only audio that includes the voices. In some embodiments of the present invention, the audio capture device 406 is configured to capture any noise that is audible to the audio capture device. One suitable example of an audio capture device 406 is a microphone that is operatively coupled to the computing device 401. In some embodiments of the present invention, the audio capture device 406 is a component of an image capture device 404 such as a webcam that captures video. Various suitable types of computing devices may be used, such as a mobile phone, tablet, personal computer etc.

In the example shown in FIG. 4, the privacy component 402 includes an audio processing component 410 and an image processing component 412, in which the audio processing component 410 is configured to analyze audio that is captured by the audio capture device 406, and in which the video processing component 412 is configured to analyze images and/or video that is captured by the image capture device 404. In some embodiment of the present invention, the audio processing component 410 is configured to analyze audio that is captured by the image capture device 404 of the computing device 401, in which the image capture device 404 is configured to capture video that includes audio.

In some embodiments of the present invention, captured audio and/or images are processed by the privacy component 402 via one or more visual and/or audio cognitive extraction engines that execute one or more or more machine learning techniques, models and/or APIs. In some embodiments of the present invention the one or more machine learning techniques, models and/or APIs are provided via a machine learning service, such as for example, through the use of IBM Watson®.

Machine learning is often employed by numerous technologies to determine inferences and/or relationships among digital data. For example, machine learning technologies, signal processing technologies, image processing technologies, data analysis technologies and/or other technologies employ machine learning models to analyze digital data, process digital data, determine inferences from digital data, and/or determine relationships among digital data. Machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

In some embodiments of the invention, the computing device 401 and/or the privacy component 402 constitute machine-executable component(s) embodied within machine(s) (e.g., embodied in one or more computer readable mediums (or media) associated with one or more machines). Such component(s), when executed by the one or more machines, (e.g., computer(s), computing device(s), virtual machine(s), etc.) cause the machine(s) to perform the operations described. In some embodiments of the invention, the privacy component 402 includes a memory 414 that stores computer executable components and instructions. Furthermore, in some embodiments of the invention, the privacy component 402 includes a processor 416 to facilitate execution of the instructions (e.g., computer executable components and corresponding instructions) by the privacy component 402. As shown, the audio processing component 410, the image processing component 412, the memory 414, and/or the processor 416 are electrically and/or communicatively coupled to one another in one or more embodiments of the invention. In some embodiments of the present invention, the computing device 401 and/or components of the computing device 401 are commutatively coupled, controlled by, and/or located within the privacy component 402. For example, in some embodiments of the present invention, the privacy component 402 further includes the image capture device 404, the audio capture device 406, and/or the UI 408.

In some embodiments of the present invention, the privacy component 402 is configured to process a machine learning model based on features that are extracted from the captured audio and/or images (e.g., via audio processing component 410, image processing component 412, and/or processor 416). In some embodiments of the invention, the privacy component 402 employs parallel computing to process the captured audio and/or images. For instance, in some embodiments of the invention, the privacy component 402 performs parallel computing associated with two or more processors that process one or more portions of the captured audio and/or images in parallel. In one example, the privacy component 402 executes a classification machine learning model using the features extracted from the captured audio and/or images. In some embodiments of the present invention, the classification machine learning model maps extracted features of the captured audio and/or images to one or more categories. In another example, the privacy component 402 executes a regression machine learning model using the features extracted from the captured audio and/or video. In some embodiment so the present invention, a regression machine learning model is used to determine relationships among both the captured audio and images of the in parallel. In yet another example, the privacy component 402 executes a clustering machine learning model using a feature matrix that is populated based at least in part on the features that are extracted from the captured audio and/or images. In some embodiments of the invention, the clustering machine learning model is a machine learning model that groups related data from the captured audio and/or images into a corresponding group using a grouping technique such as, for example, a nearest neighbor's technique.

As noted above, the privacy component 402 is configured to automatically preserve the privacy of sensitive information that is found in a UI of a computing device (e.g., UI 408 of computing device 401). In particular, in some embodiment the present inventions, the privacy component 402 is configured to detect one or more privacy objects that are being presented to a first user via a UI of a computing device, in which the one or more detected objects include sensitive data. In some embodiments of the present invention, the privacy component 402 detects privacy objects by identifying encrypted files that are currently being viewed on a screen of the UI, such as fields that are being viewed in an editor, browser, or window. In some embodiments of the present invention, the privacy component 402 detects privacy objects by identifying all the tabs in a browser that that includes a uniform resource locator (URL) that include a particular prefix. For example, in some embodiments of the present invention, the privacy component 402 detects privacy objects by identifying all the tabs in a browser that includes the prefix "https://", which denotes a secured connection. In some embodiments of the present invention, the privacy component 402 detects privacy objects by identifying files and/or directories that are being displayed on a screen of the UI, in which the files and/or directories have preconfigured permissions that establish whether or not others are allowed to view and/or read the files and/or directories. In some embodiments of the present invention, the privacy component 402 detects privacy objects by identifying directories and/or files which have a name that is indicative of containing private information, such as directories and/or files that include the words "personal," "bank", "credit card", "taxes", or other relevant keywords. In some embodiments of the present invention, a set of keywords that are commonly used for naming can be used as a guideline to identify directories/files that have a name that is indicative of containing private information.

In some embodiments of the present invention, the user is prompted to provide feedback regarding the detected objects. For example, in some embodiments of the present invention, the user is asked via the UI to confirm whether the objects that were detected by the privacy component 402 did in fact contain sensitive information. In some embodiments of the present invention, the results of the feedback are fending into a machine learning process, such as a supervised machine learning process, to improve the detection of subsequently displayed privacy objects.

The privacy component 402 is configured to evaluate a security status of the UI based at least in part on analyzing audio captured by an audio capture device of the computing device (e.g., audio capture device 406 of computing device 401). In some embodiments of the present invention, the security status is indicative of whether a potential unauthorized viewing event is occurring (e.g., whether one or more second users other than the first user are viewing the UI). For example, in some embodiments of the present invention, the privacy component 402 is configured to analyze the captured audio by generating one or more voiceprints form the captured audio and detecting that at least one of the one more generated voiceprints do not match a stored voiceprint of the first user.

In some embodiments of the present invention, the privacy component 402 is configured to analyze the captured audio by detecting one or more voices in the captured audio data that are not of the first user and then for each given detected voice that is not of the first user, calculating a corresponding distance between a location of the given voice and a location of the computing device. In some embodiments of the present invention, if at least one of the corresponding distances is less than or equal to a configurable threshold distance, the privacy component 402 would then conclude that an unauthorized viewing of the UI by one or more second users is likely occurring. In some embodiments of the present invention, the threshold distance can be a preselected distance from a reference point, in which the reference point can be, for example, a location of the computer device." In some embodiments of the present invention, the configurable threshold distance is 1-5 feet from a display monitor of the computing device 401. In some embodiments of the present invention, the threshold distance comprises a vector having a plurality of distances such that different preservation actions may be executed based on which of the plurality of distances the corresponding distance is less than or equal to. A variety of known suitable techniques can be used for calculating distances of the source of voices captured in audio data. In some embodiments of the present invention, the threshold distance may be a pre-set distance that is entered by the privacy component 402 and/or a distance that is learned overtime via machine learning. For example, in some embodiments of the present invention, the user may be prompted for feedback regarding whether the security status of the UI was in fact unsecured at the time that the privacy component 402 concluded that the security status of the UI was unsecured. Based on the received feedback, the privacy component 402 may train and/or updates one or more machine learning models such that the threshold distance(s) used in further detection processes is updated. In some embodiments of the present invention, the feedback is further used to associate various privacy-preservation with one or more threshold distances, such that at first calculated distance a first action is taken and at a second calculated distance a second action is taken. For example, a first masking operation may be performed when the corresponding distance is less than or equal to a first threshold distance, such as masking a first set of characters from a text string; whereas a second masking operation may be performed when the corresponding distance is less than or equal to a second threshold distance, such as masking a second set of characters from the text string after the first set of characters have been masked. In this way, the privacy component 402 can dynamically adapt the privacy protections actions that are executed based on the relative likelihood that an unauthorized viewing event is occurring via machine learning.

In some embodiments of the present invention, the privacy component 402 is configured to evaluate a security status of the UI based is further based on analyzing images captured by an image capture device of the computing device (e.g., image capture device 404 of computing device 401). For example, in some embodiments of the present invention, the privacy component 402 is configured to analyze the captured images by detecting, via facial recognition, that one or more faces in the captured images are not of the first user. This may be achieved by, for example, identifying from images that were captured by a camera whether one or more subsequently captured images show a person who is viewing the screen of the computing device who is not the first user. In some embodiments of the present invention, this is achieved via eye tracking technology. In some embodiments of the present invention, the privacy component 402 is configured to analyze the images captured by detecting, via facial recognition, a presence of two or more faces in the captured images. In some embodiments of the present invention, the analysis of the images is only performed to supplemental the audio analysis when a person, who is within viewing distance of the UI, is not making an audible vocalization in the captured audio.

The privacy component 402 is configured to activate a privacy mode of the UI based at least in part on determining that the security status of the UI is in an unsecure state. In some embodiments of the present invention, the activating of the privacy mode includes executing one or more privacy actions that are associated with one or more of the detected privacy objects. In some embodiments of the present invention, the one or more privacy includes include hiding, masking, and/or encrypting of the sensitive data of the one or more privacy objects, or other suitable privacy operations. In some embodiments of the present invention, the hiding operations include one or more of an invisible operation, a minimize operation, or a move-to-invisible-workspace operation. In some embodiments of the present invention, the minimization operation is configured to minimize a window and/or screen of the UI that is showing the sensitive information.

In some embodiments of the present invention, the activing of the privacy mode includes determining a privacy-preserving operation for each of the detected private objects. In some embodiments of the present invention, the activing of the privacy mode includes determining a privacy-preserving operation for each of the detected private objects as well as determining an operation for retrieval. In some embodiments of the present invention, the determination is achieved via the querying of a database. In some embodiments of the present invention, the query includes the use of tuple such as a tuple having an object, a privacy operation, and an unlock operation. In some embodiments of the present invention, the unlocking operation is displaced on the UI as a selectable feature such that the user may select via an icon on the screen to request that certain sensitive data, such as a password, be unlocked and displayed. In some embodiments of the present invention, the hiding and/or unlocking operations are performed explicitly by the user in response to clicking on a privacy-preserving widget on a container of the UI (e.g., a window, tab, panel, etc.). In some embodiments of the present invention, the privacy actions that are executed for the privacy objects are configured by the user. For example, in some embodiments of the present invention, a user's preferences are stored on the computing device such that upon the detection of a potential unauthorized viewing event one or more privacy operations are performed in accordance with the user's preferences.

Figure 5:
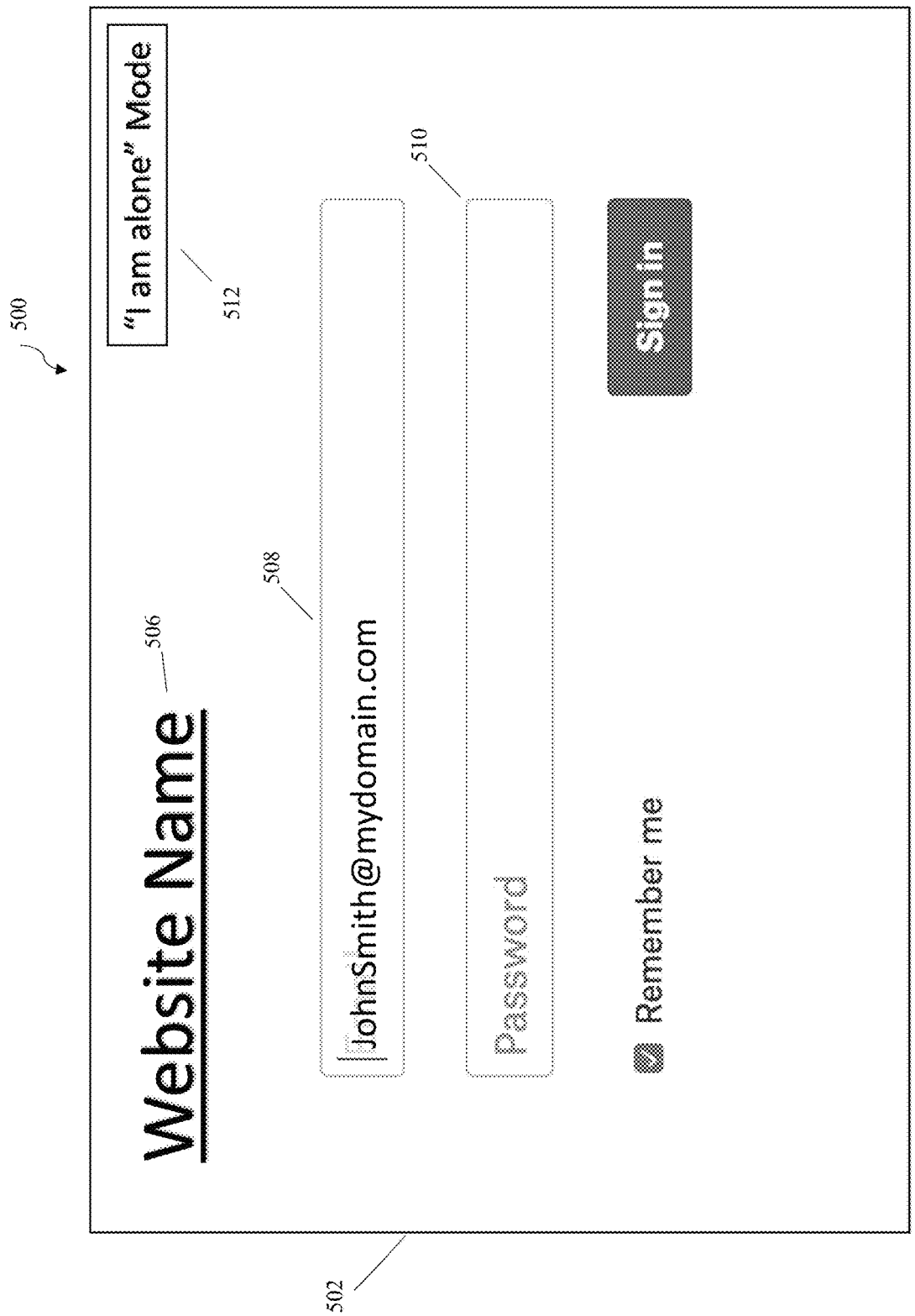
FIG. 5 depicts an exemplary first screen of a UI in accordance with one or more embodiments of the present invention.
Figure 6:
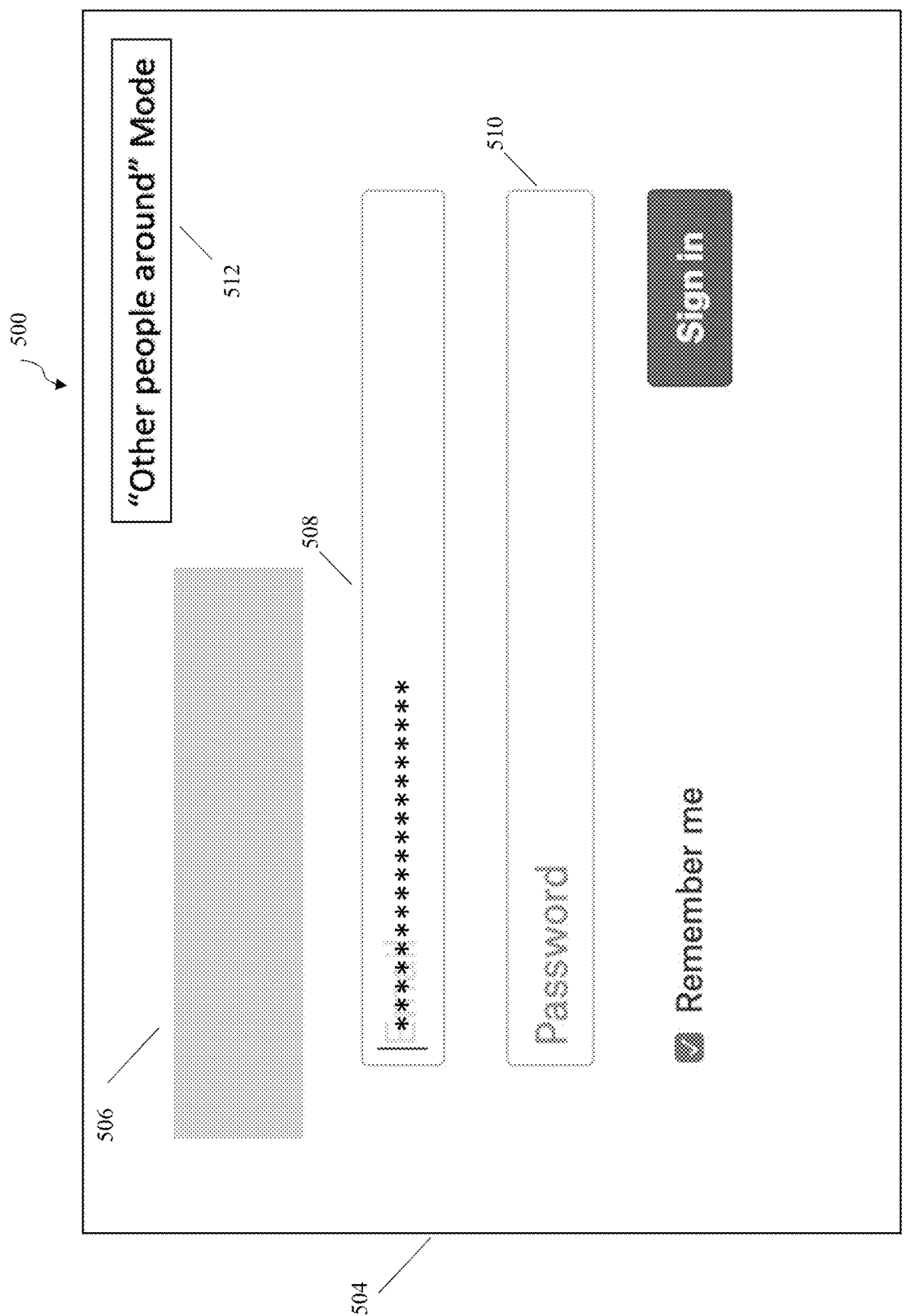
FIG. 6 depicts an exemplary second screen of the UI of FIG. 5 in accordance with one or more embodiments of the present invention.

FIG. 5-6 illustrate an example UI 500, in which FIG. 5 shows a first screen 502 of UI 500, and in which FIG. 6 shows a second screen 504 of UI 500 in accordance with one or more embodiments of the present invention. First screen 502 is a screen of UI 500 that may be displayed when the security status of UI 500 is evaluated as being in a secured state (e.g., an unauthorized viewing event has not been and/or is not being detected). As shown in FIG. 5, first screen 502 is configured to display an authentication website that includes a website name 506, an email address field 508 and a password field 510. First screen 502 further includes an icon and/or widget 508 that indicates the status of UI 500 as to whether UI 500 is in a privacy mode. For example, as shown FIG. 5, the icon and/or widget 512 of first screen 502 indicates that the security status of UI 500 has been evaluated as being in a secured state (e.g., displays an "I am alone" mode). First screen 502 is configured to display the full email address of the user in the email address field 508, as well as the password and the website name 502 without masking upon the icon and/or widget 512 indicated that the security status of UI 500 has been evaluated as being in a secured state.

Second screen 504 is a screen of UI 500 that may be displayed when the security status of UI 500 is evaluated as being in an unsecured state (e.g., an unauthorized viewing event has been and/or is being detected). As shown in FIG. 6, second screen 504 is configured to display an authentication website that includes the website name 506, the email address field 508 and the password field 510. The UI screen 600 further includes the icon and/or widget 512 that indicates the status of UI as to whether UI 500 is in a privacy mode. In second screen 504, the icon and/or widget 512 indicates that the security status of UI 500 has been evaluated as being in an unsecured state (e.g., displays an "Other people around" mode). Second screen 504 is configured to mask the characters that are entered into the email address field 508 and the password field 510 upon the icon and/or widget 508 indicating that the security status of UI 500 has been or is being evaluated as being in an unsecured state, as well as configured to hide the website name 506 upon the icon and/or widget 508 indicating that the security status of UI 500 has been or is being evaluated as being in an unsecured state. In some embodiments of the present invention, second screen 504 is configured to mask the characters of the email address only if the username is detected as including a proper name of person (e.g. john.smith@email.com).

Referring back to FIG. 4, the privacy component 402 is configured to deactivate the privacy mode based at least in part on determining that the security status has changed from the unsecure state to a secure state based at least in part on analyzing the captured audio. In some embodiments of the present invention, the privacy component 402 is configured determine that the security status has changed from unsecure to secure by detecting, from the captured audio, that one or more second users have not spoken in a configurable threshold period of time. In some embodiments of the present invention, the privacy component 402 is configured determine that the security status of the UI has changed from unsecure to secure by updating the calculations of corresponding distances between the location of the voices and the location of the computing device. In some embodiments of the present invention, if all of the corresponding distances is greater than the configurable threshold distance, the privacy component 402 would then conclude that the security status of the UI has changed from unsecure to secure.

In some embodiments of the present invention, the privacy component 402 is configured to determine that the security status has changed from the unsecure state to a secure state further based on analyzing images captured by an image capture device of the computing device (e.g., image capture device 404 of computing device 401).

In some embodiments of the present invention, the deactivating of the privacy mode includes executing one or more deactivation related privacy. In some embodiments of the present invention, the one or more deactivation related privacy includes include unhiding, unmasking, or decrypting of sensitive data that is associated with the one or more detected privacy objects, or other suitable deactivation related privacy operations. In some embodiments of the present invention, each privacy action is associated with a deactivation related privacy action, in which the deactivation related privacy action and privacy action are symmetric to one and other. For example, in some embodiments of the present invention, if a first privacy action for a first object is to mask certain sensitive data, a deactivation related privacy action associated with the first object may unmask the same sensitive data. In some embodiments of the present invention, the deactivation related privacy actions are asymmetrical. For example, in some embodiments of the present invention, if the privacy action masks all characters that are entered into a field, a deactivation related privacy action may unmask only a subset of the characters in the field. In some embodiments of the present invention, the deactivation related privacy action may unmask the subset of the masked characters over time based on the user's context.

In some embodiments of the present invention, the privacy component 402 is configure to receive an input from the user via a UI (e.g., UI 500) that requests a change of the privacy state of the UI. For example, in some embodiments of the present invention, privacy component 402 is configured to receive one or more keyboard shortcuts that are pressed by the user. In some embodiments of the present invention, a first shortcut is associated with an intent of a user to change the privacy state of the UI from a private mode to a non-private mode, and a second shortcut is associated with an intent to change the privacy state of the UI from the non-private mode to the private mode. In some embodiments of the present invention, a single shortcut is utilized such that the privacy state of the UI is configured to cycle between a non-private mode and a private mode upon receiving the shortcut via the UI. In some embodiments of the present invention, the user requests a change in the privacy state of the UI via selecting certain items and/or locations on a screen that displayed by the UI (e.g., click on icon/widget 512 of first screen 502 or second screen 504).

Figure 7:
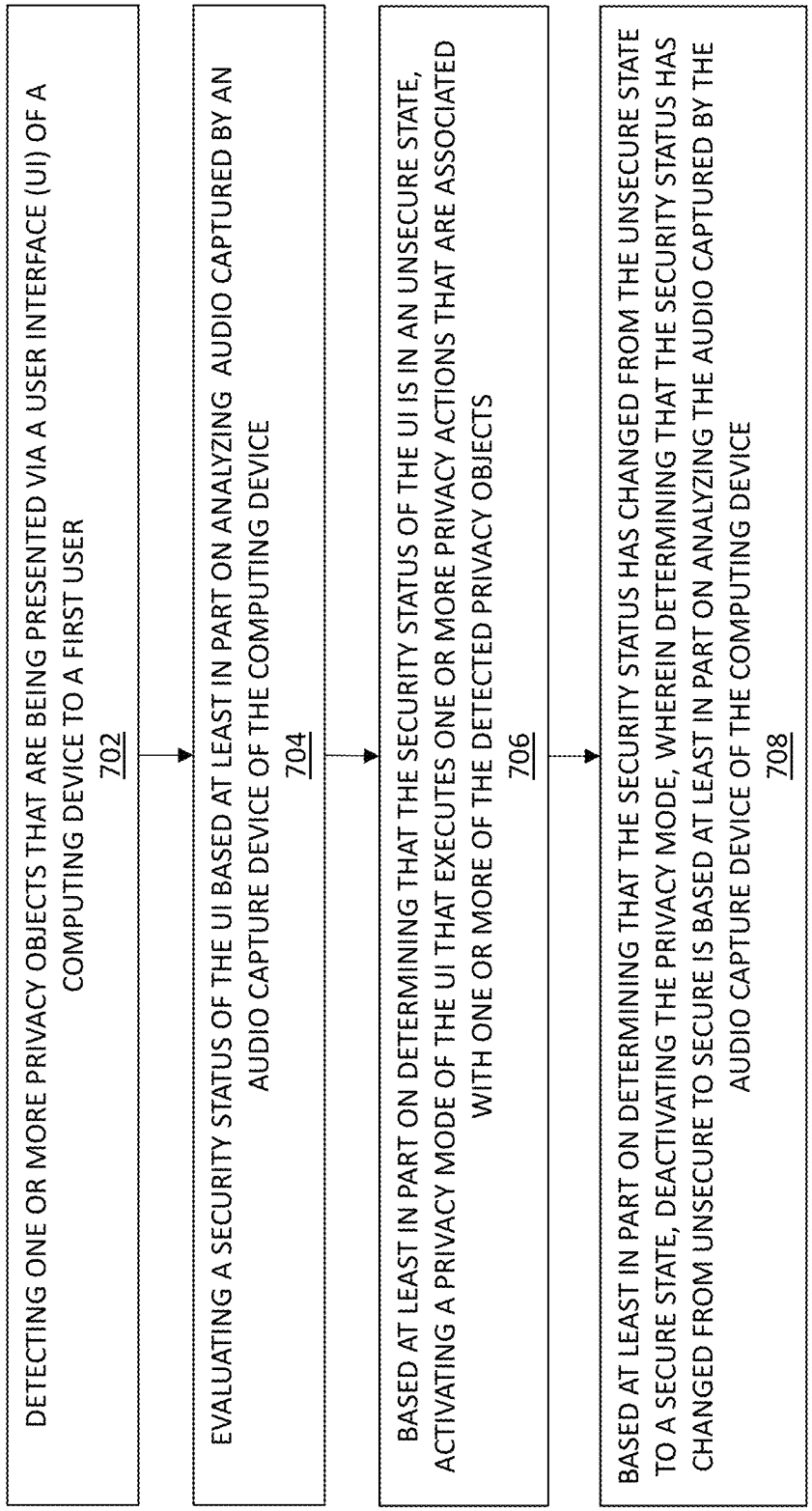
FIG. 7 depicts a flow diagram illustrating a methodology in accordance with one or more embodiments of the present invention.

Additional details of the operation of system 400 will now be described with reference to FIG. 7, in which FIG. 7 depicts a flow diagram illustrating a methodology 700 according to one or more embodiments of the present invention. At 702, one or more privacy objects that are being presented via UI of a computing device to a first user are detected (e.g., privacy component 402), in which the one or more of the detected privacy objects include sensitive data. At 704, a security status of the UI is evaluated based at least in part on analyzing audio captured by an audio capture device of the computing device (e.g., audio processing component 410). At 706, a privacy mode of the UI that executes one or more privacy actions that are associated with one or more of the detected privacy objects is activated based at least in part on determining that the security status is in an unsecure state (e.g., privacy component 402). At 708, the privacy mode is deactivated based at least in part on determining that the security status has changed from the unsecure state to a secure state, in which determining that the security status has changed from unsecure to secure is based at least in part on analyzing the audio captured by the audio capture device of the computing device (e.g., audio processing component 410).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for automatically preserving privacy in a user interface, the computer-implemented method comprising:
  detecting, by a system comprising one or more processors, one or more privacy objects that are being presented via a user interface (UI) of a computing device to a first user;
  evaluating, by the system, a security status of the UI based at least in part on analyzing audio captured by an audio capture device of the computing device; and
  based at least in part on determining that the security status of the UI is in an unsecure state, activating, by the system, a privacy mode of the UI that executes one or more privacy actions that are associated with one or more of the detected privacy objects,
  wherein the UI includes a screen configured to display an authentication website that includes an email address field, a password field, and a widget, wherein the widget indicates the security status of UI, wherein upon the widget indicated that the security status of UI as being in a secured state the screen is configured to display, without masking, the full email address of the first user in the email address field and the password of the user in the password field.

2. The computer-implemented method of claim 1, wherein analyzing the audio captured comprises:
  generating one or more voiceprints from the captured audio; and
  detecting that at least one of the one or more generated voiceprints do not match a stored voiceprint of the first user.

3. The computer-implemented method of claim 1, wherein analyzing the audio captured comprises:
  detecting one or more voices in the captured audio that are not of the first user;
  for each given voice that is detected as not being of the first user, calculating a corresponding distance between a location of the given voice and a location of the computing device; and
  detecting that at least one of the corresponding distances is less than or equal to a configurable threshold distance.

4. The computer-implemented method of claim 1, wherein executing the one or more privacy actions include hiding, masking, or encrypting sensitive data that is associated with one or more of the detected privacy objects.

5. The computer-implemented method of claim 1, wherein determining that the security status has changed from the unsecure state to a secure state comprises detecting, from the captured audio, that one or more second users have not spoken in a configurable threshold period of time.

6. The computer-implemented method of claim 1, wherein evaluating a security status of the UI based is further based on analyzing images captured by an image capture device of the computing device.

7. The computer-implemented method of claim 1 further comprising:
  based at least in part on determining that the security status has changed from the unsecure state to a secure state, deactivating, by the system, the privacy mode, wherein determining that the security status has changed from unsecure to secure is based at least in part on analyzing the audio captured by the audio capture device of the computing device.

8. A system for automatically preserving privacy in a user interface, the system comprising one or more processors configured to perform a method comprising:
  detecting, by the system, one or more privacy objects that are being presented via a user interface (UI) of a computing device to a first user;
  evaluating, by the system, a security status of the UI based at least in part on analyzing audio captured by an audio capture device of the computing device; and
  based at least in part on determining that the security status of the UI is in an unsecure state, activating, by the system, a privacy mode of the UI that executes one or more privacy actions that are associated with one or more of the detected privacy objects,
  wherein the UI includes a screen configured to display an authentication website that includes an email address field, a password field, and a widget, wherein the widget indicates the security status of UI, wherein upon the widget indicated that the security status of UI as being in a secured state the screen is configured to display, without masking, the full email address of the first user in the email address field and the password of the user in the password field.

9. The system of claim 8, wherein analyzing the audio captured comprises:
  generating one or more voiceprints from the captured audio; and
  detecting that at least one of the one or more generated voiceprints do not match a stored voiceprint of the first user.

10. The system of claim 8, wherein analyzing the audio captured comprises:
  detecting one or more voices in the captured audio that are not of the first user;
  for each given voice that is detected as not being of the first user, calculating a corresponding distance between a location of the given voice and a location of the computing device; and
  detecting that at least one of the corresponding distances is less than or equal to a configurable threshold distance.

11. The system of claim 8, wherein executing the one or more privacy actions include hiding, masking, or encrypting sensitive data that is associated with one or more of the detected privacy objects.

12. The system of claim 8, wherein determining that the security status has changed from the unsecure state to a secure state comprises detecting, from the captured audio, that one or more second users have not spoken in a configurable threshold period of time.

13. The system of claim 8, wherein evaluating a security status of the UI based is further based on analyzing images captured by an image capture device of the computing device.

14. The system of claim 13, wherein the method further includes:
  based at least in part on determining that the security status has changed from the unsecure state to a secure state, deactivating, by the system, the privacy mode, wherein determining that the security status has changed from unsecure to secure is based at least in part on analyzing the audio captured by the audio capture device of the computing device.

15. A computer program product for automatically preserving privacy in a user interface, the computer program product comprising a computer readable storage medium having program instructions embodied therewith, the program instructions executable by a system comprising one or more processors to cause the system to perform a method comprising:
   detecting, by the system, one or more privacy objects that are being presented via a user interface (UI) of a computing device to a first user;
   evaluating, by the system, a security status of the UI based at least in part on analyzing audio captured by an audio capture device of the computing device; and
   based at least in part on determining that the security status of the UI is in an unsecure state, activating, by the system, a privacy mode of the UI that executes one or more privacy actions that are associated with one or more of the detected privacy objects,
   wherein the UI includes a screen configured to display an authentication website that includes an email address field, a password field, and a widget, wherein the widget indicates the security status of UI, wherein upon the widget indicated that the security status of UI as being in a secured state the screen is configured to display, without masking, the full email address of the first user in the email address field and the password of the user in the password field.

16. The computer program product of claim 15, wherein analyzing the audio captured comprises:
   generating one or more voiceprints from the captured audio; and
   detecting that at least one of the one or more generated voiceprints do not match a stored voiceprint of the first user.

17. The computer program product of claim 15, wherein analyzing the audio captured comprises:
   detecting one or more voices in the captured audio that are not of the first user;
   for each given voice that is detected as not being of the first user, calculating a corresponding distance between a location of the given voice and a location of the computing device; and
   detecting that at least one of the corresponding distances is less than or equal to a configurable threshold distance.

18. The computer program product of claim 15, wherein the method further includes:
   based at least in part on determining that the security status has changed from the unsecure state to a secure state, deactivating, by the system, the privacy mode, wherein determining that the security status has changed from unsecure to secure is based at least in part on analyzing the audio captured by the audio capture device of the computing device.

* * * * *